March 7, 1933.  E. V. HILL  1,900,813
PSYCHROMETER
Filed May 7, 1930

Inventor
E. VERNON HILL.

By
Albert Grobstein Attorney

Patented Mar. 7, 1933

1,900,813

UNITED STATES PATENT OFFICE

EARL VERNON HILL, OF CHICAGO, ILLINOIS, ASSIGNOR TO E. VERNON HILL COMPANY, A CORPORATION OF ILLINOIS

PSYCHROMETER

Application filed May 7, 1930. Serial No. 450,576.

This invention relates to a psychrometric instrument adapted for quick, convenient and accurate determination of the relative humidity of an atmosphere, so that the values obtained by use of the instrument may be used for properly adjusting the atmosphere by conditioning or like measures.

More specifically, the invention is directed to a portable psychrometer for the determination of the relative humidity of the air in a room, factory, or auditorium so that the values obtained may indicate the air conditioning necessary for maintenance of proper humidity values, either for personal comfort or for industrial processes.

In the prior art, various proposals have been made for determining the relative humidity of air. One such method has been to determine the wet bulb and dry bulb temperatures of the air and apply these values to a psychrometric chart, which latter consists of a large number of linear values indicating a relationship between wet and dry bulb temperatures and relative humidity. This method has been extremely awkward and has, among other things, necessitated the carrying around of a more or less involved chart to which the temperature readings were referred, and also presented the disadvantage that considerable time was spent in referring the temperature values to the graphic chart.

Again, it has been proposed to mount wet and dry bulb thermometers upon an instrument board together with an integrating device, so that relative humidity may be read directly upon the instrument. However, such instruments have been of rather complex construction involving sliding lengthy scales protruding from the instrument and liable to fall out and be lost, and also have had associated therewith fans and fan-operating mechanism which not only entailed bulky devices expensive to manufacture, but gave rise to inaccuracies of temperature measurement and consequent inaccurate humidity values.

I have devised a psychrometer according to the present invention which obviates the difficulties of the prior art; it is simple in construction, inexpensive to manufacture, and provides a means of determining relative humidity with a quickness and accuracy which has hitherto been impossible in the prior art.

My preferred embodiment is indicated in the accompanying drawing.

Figure 1:
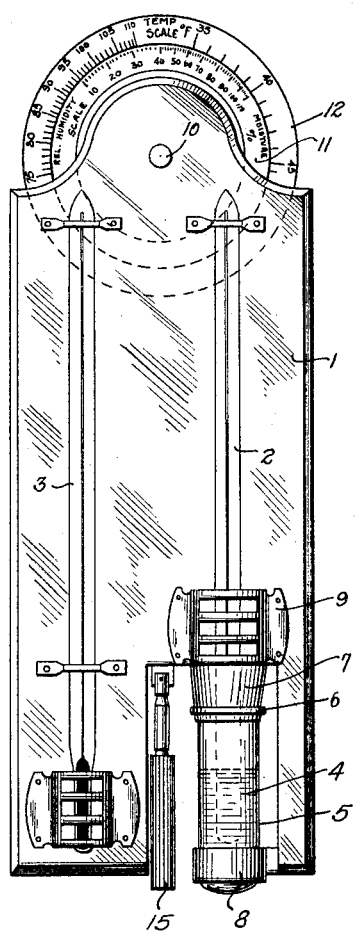
Figure 1 is a view in elevation showing the complete instrument not in use.
Figure 2:
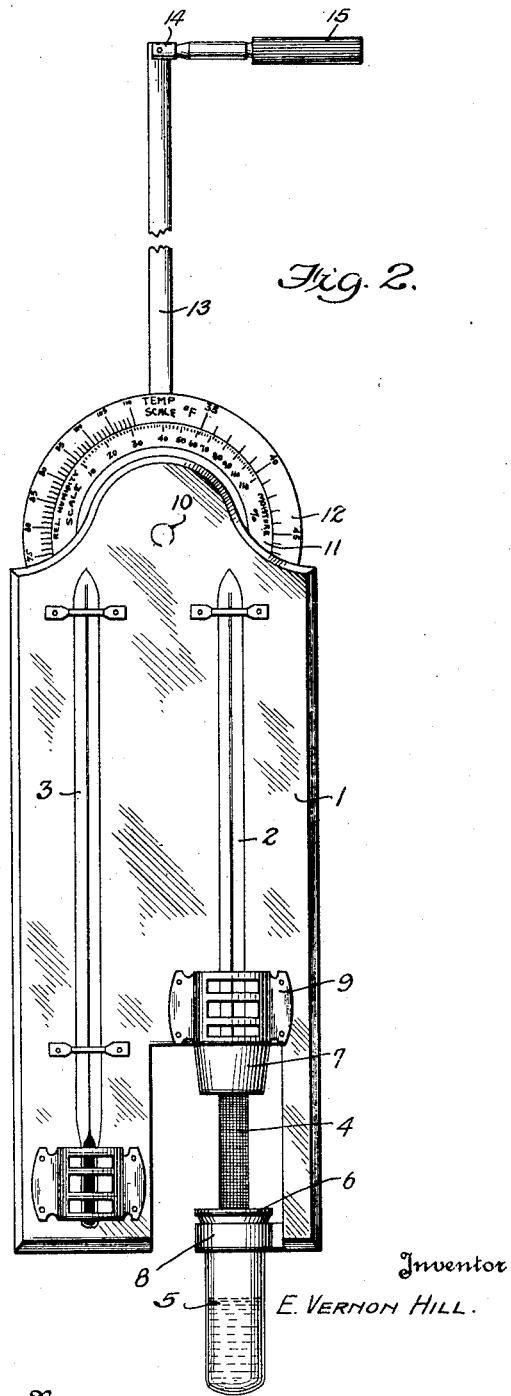
Figure 2 is a view similar to Figure 1 showing the instrument in position for use.

Mounted on the base 1 which may be of wood, fiber or analogous material are the wet bulb thermometer 2 and dry bulb thermometer 3. Surrounding the bulb of thermometer 2 is the wick 4 adapted to dip in the water contained in well 5, which has a lip 6. The lip 6 is adapted to engage the rubber or cork stopper 7 as shown in Figure 1, or it may rest on the ring support 8 when in position of use, as shown in Figure 2. The stopper 7 is held rigidly upon the board 1 by the retaining member 9. Mounted at the top of the instrument by means of the pivot pin 10 is the circular scale composed of concentric members 11 and 12. These members are movable relatively to each other about the pin 10. Preferably, member 11 is fixed immovably while member 12 is adapted for motion about the pin 10 as an axis. Member 12 has graduations thereon representing degrees temperature while member 11 has graduations thereon representing relative humidity in percentage values. Pivoted at 10 also is the rod 13 to which is attached by means of loose dovetail joint 14 the handle 15.

The method of determining relative humidity is as follows:

The well 5 is dropped from closed to open position, handle 15 is moved to the position shown in Figure 2 and the entire instrument whirled in the air until the falling mercury in the wet bulb thermometer comes to a standstill. The dry bulb thermometer reading is noted and by moving member 12, the reading corresponding to this on member 12 is placed on a line forming an extension with the 100% line on member 11. The wet bulb reading is taken and the corresponding reading is sighted on member 12 without moving the same from its position. The line on member 11 which forms an extension with the sighted reading indicates the relative humidity of the air. For example, if the dry bulb reads 70 degrees F. and the wet bulb reads 55 degrees F., the 70 degree line of the member 12 is set at the 100% mark on member 11. While in this position, the 55 degree line of the member 12 is noted and the graduation opposite it on member 11 is read. It indicates the relative humidity which is sought, and in this case is 36½%.

From the above description, it will be seen that I have provided a psychrometer which by the novel construction of the water well eliminates evaporation of water when the instrument is not in use and protects the wick from dirt; which permits adequate air motion about the wet bulb, essential for correct determination of wet bulb temperature; and finally which eliminates the use of all charts and tables for determining humidity.

Having thus described my invention within the requirements of the statutes, I desire to claim my device broadly in the appended claims except for the limitations imposed by the prior art.

I claim:

1. In a psychrometer comprising a body having a dry and a wet bulb thermometer mounted thereon and relatively movable concentric scale members pivotally secured to said body, the combination of a handle for whirling the body pivotally mounted to the pivot of the concentric scale members.

2. In a psychrometer comprising a body having a dry and a wet bulb thermometer mounted thereon and relatively movable concentric scale members pivotally secured to said body and consisting of two discs having cooperative sliding marginal edges, one of the discs having numbered graduations representing degrees of temperature and the other disc having numbered graduations representing percentages of relative humidity, the combination of a handle for whirling the body pivotally mounted to the pivot of the concentric scale members.

In testimony whereof, I hereunto set my hand.

EARL VERNON HILL.